United States Patent
Liberman

(10) Patent No.: US 7,563,375 B2
(45) Date of Patent: Jul. 21, 2009

(54) DIRECT OSMOSIS CLEANING

(75) Inventor: Boris Liberman, Tel Aviv (IL)

(73) Assignee: I.D.E. Technologies Ltd., Kadima (IL)

( * ) Notice: Subject to any disclaimer, the term of this patent is extended or adjusted under 35 U.S.C. 154(b) by 46 days.

(21) Appl. No.: 11/748,234

(22) Filed: May 14, 2007

(65) Prior Publication Data

US 2007/0246425 A1 Oct. 25, 2007

Related U.S. Application Data

(62) Division of application No. 10/718,539, filed on Nov. 24, 2003, now abandoned.

(30) Foreign Application Priority Data

| Jan. 9, 2003 | (IL) | ................................ 153870 |
| Aug. 26, 2003 | (IL) | ................................ 157581 |

(51) Int. Cl.
*B01D 65/02* (2006.01)

(52) U.S. Cl. .................. 210/636; 210/321.69; 210/650; 210/652; 210/791; 210/797

(58) Field of Classification Search ............ 210/321.69, 210/636, 650, 652, 791, 797, 798
See application file for complete search history.

(56) References Cited

U.S. PATENT DOCUMENTS

| 3,853,756 A | 12/1974 | Stana |
| 4,141,825 A | 2/1979 | Conger |
| 4,961,851 A | 10/1990 | Barbachano et al. |
| 5,207,916 A | 5/1993 | Goheen et al. |
| 5,354,466 A | 10/1994 | Yunoki et al. |
| 5,403,479 A | 4/1995 | Smith et al. |
| 6,001,254 A | 12/1999 | Espenan et al. |
| 6,755,970 B1 | 6/2004 | Knappe et al. |

FOREIGN PATENT DOCUMENTS

| EP | 0 595 689 A1 | 5/1994 |
| EP | 0 768 112 A1 | 4/1997 |
| FR | 2 811 315 A1 | 1/2002 |
| JP | 2000-079328 A | 3/2000 |

*Primary Examiner*—John Kim
(74) *Attorney, Agent, or Firm*—Birch, Stewart, Kolasch & Birch LLP

(57) ABSTRACT

A method of cleaning a fouled RO membrane in a module for RO separation, the membrane having feed side and permeate side, the foulant accumulating at the feed side. The cleaning method comprises:

feeding concentrated saline solution to the feed side of the RO membrane under the high gauge pressure of the normal RO separation process;

feeding dilute saline solution to the permeate side of the RO membrane under higher pressure than the permeate pressure of the normal RO process, so that a net driving differential $\Delta PN$ is directed to the feed side, whereby the solvent is being sucked from the permeate side to the feed side, penetrates into the interface between the membrane and the accumulated foulant, and separates the foulant from the membrane surface; and withdrawing the concentrated saline solution together with the separated foulant and the penetrated solvent from the feed side of the RO membrane.

19 Claims, 5 Drawing Sheets

DIRECT OSMOSIS CLEANING

This application is a Divisional of application Ser. No. 10/718,539, filed on Nov. 24, 2003, now abandoned, the entire contents of which are hereby incorporated by reference and for which priority is claimed under 35 U.S.C. § 120. Application Ser. No. 10/718,539 claims priority under 35 U.S.C. § 119(a) on Patent Application No(s). 153870 and 157581 filed in ISRAEL on Jan. 9, 2003 and Aug. 26, 2003, respectively, the entire contents of which are hereby incorporated by reference.

FIELD OF THE INVENTION

This invention relates to method and system for cleaning membranes, in particular reverse osmosis and nanofiltration membranes in desalination and water treatment plants.

BACKGROUND OF THE INVENTION

The method of reverse osmosis (RO) is an effective and energy-saving method of desalination which is widely employed for obtaining water for industrial use, for agriculture, potable water and ultapure water. The method consists in applying mechanical (gauge) pressure over a saline solution, such as seawater, which is higher than the osmotic pressure of the same solution, in a volume delimited by a semi-permeable membrane (RO membrane). Thereby, the solvent (water) is squeezed through the membrane to its "permeate" side while dissolved salts remain in the solution at the "feed" side of the membrane.

Herein, osmotic pressures of solutions are referenced to pure solvent, i.e. if given saline water solution has osmotic pressure PO, this means, pure water from the other side of an osmotic membrane will permeate towards this solution as if under gauge pressure PO.

When the RO membrane is used for a long time for separation of salts, other components of the raw solution termed "foulants" herein, such as suspended particles, organic matter, colloids tend to accumulate on the "feed" surface of the membrane. Some dissolved salts also may precipitate on the surface, forming scale. A fouled membrane has reduced separability, increased pressure losses and therefore has to be cleaned.

It is known to clean the membrane by stopping the production process and pumping cleaning chemical solutions to wash the fouled surface. Such methods are costly, not very effective, and create new environmental problems.

A more effective method is using the direct osmosis by feeding saline solution to the fouled feed side of the RO membrane while supplying solvent (water) to the permeate side of the membrane. The higher osmotic pressure at the feed side sucks the water from the permeate side to the feed side of the RO membrane, whereby the water penetrates into the interface between the membrane and the accumulated foulant, and separates the foulant from the membrane surface.

Publications EP0768112 and JP2000-079328 disclose similar implementations of the direct osmosis method. It is suggested that when the membrane is cleaned, the production RO process is stopped, the saline solution is supplied to the feed side of the membrane essentially without pressure (or at least under pressure lower than the osmotic pressure of the solution), and water is supplied to the permeate side of the membrane also without pressure. Thus, the cleaning water is sucked back to the feed side essentially under the net differential between the two osmotic pressures.

However, the typical RO membrane is a tight multi-layered structure with very narrow passages (see FIG. 5) where water flows very slowly. Some areas of the membrane are close to the channel supplying water, other areas are remote. On the other hand, the osmotic pressure of the typical saline solution—seawater or brine—is high, and the net differential is also high. The combination of these factors leads to very fast back-suction of water ("catastrophic" filtration) from the permeate side to the feed side through the close areas of the membrane. As a result, the water can not reach the remote areas of the membrane before it is entirely sucked in the close areas, while the concentration at both sides of the membrane in the close areas is soon equalized. The cleaning process, therefore, stops in a few seconds and the membrane cannot be cleaned uniformly.

SUMMARY OF THE INVENTION

In accordance with the present invention, there is provided a direct-osmosis method of cleaning fouled RO membranes in modules for RO separation. The membrane has a feed side and an opposite permeate side and extends between a front end and a rear end of the RO module. The module has a front-end feed port and a rear-end brine port in communication with the feed side of the membrane, and at least one permeate port in communication with the permeate side of the membrane.

The normal RO separation process in the same module includes feeding raw saline solution comprising water, dissolved salts and a potential foulant with osmotic pressure $PO1$, to the front-end feed port at gauge pressure $PF1>PO1$, collecting permeate with osmotic pressure $PO2$ from the permeate port at gauge pressure $PP2$, and removing residual brine from the rear-end feed port at gauge pressure $PB3$. During this process, the foulant accumulates at the feed side of the RO membrane.

The cleaning method comprises:

a) feeding dilute saline solution to the permeate side of the RO membrane under gauge pressure $PD4$ and osmotic pressure $PO4$;

b) feeding concentrated saline solution to the feed side of the RO membrane under gauge pressure $PC5$ and osmotic pressure $PO5$.

c) withdrawing the concentrated saline solution together with the separated foulant and the penetrated water from the feed side of the RO membrane.

At step (b), the net driving differential $\Delta PN$ resulting from pressures $PO4$, $PD4$, $PO5$, and $PC5$ is directed to the feed side, whereby the water is sucked from the permeate side of the RO membrane to the feed side of the RO membrane, penetrates into the interface between the membrane and the accumulated foulant, and separates the foulant from the membrane surface.

In the inventive method, the gauge pressure $PC5$ is between the pressures $PF1$ and $PO1$ in the normal RO process, while the $\Delta PN$ directed to the feed side is provided by raising the gauge pressure $PD4$ with respect to the gauge pressure $PP2$ in the normal RO process.

The concentrated saline solution may be fed to the rear-end brine port at step (b), and withdrawn from the front-end feed port at step (c), or vice-versa.

The concentrated saline solution of step (b) may be residual brine supplied from another RO module performing normal RO separation process, or the raw saline solution of the normal RO separation process.

The dilute saline solution of step (a) may be the permeate obtained in the same RO module during its normal separation process and stored, may be permeate obtained from another RO module performing normal RO separation process, or may be residual brine obtained in a next-stage separator of the same desalination plant, or from any other source. Advantageously, if the cleaned RO module is a first-stage module, then residual brine obtained from the first-stage permeate in a second-stage separator may be used.

In a preferred embodiment, raw saline solution and permeate are fed to the respective sides of the membrane by the same pressure source (pump) that provides the gauge pressure PF1 for the normal RO process.

The method is advantageously applicable for RO membranes, where the permeate side of the membrane communicates with the permeate port through a permeate channel, and the membrane has parts adjacent the permeate channel and parts remote therefrom. The net driving differential $\Delta PN$ in this case is such that it allows the dilute saline solution to reach the remote parts of the membrane before the water is entirely sucked to the feed side of the membrane through the parts adjacent to the permeate channel.

The efficiency of the method may be enhanced in the following ways: Alternating from time to time the feeding and the withdrawing of the concentrated saline solution between the front-end and the rear-end feed port; application of pulsating gauge pressure PD4; changing from time to time gauge pressure PD4 and/or PC5 so that the net pressure differential $\Delta PN$ is reversed towards the permeate side, whereby the RO module performs intermittently normal RO separation process.

In view of the fact that the standard RO module has a front-end permeate port and a rear-end permeate port in communication with said permeate side of the RO membrane, the cleaning method may be further improved. The feeding in steps (a) and (b) is performed through the same-end port of the respective side, and a second dilute saline solution is fed to the other-end permeate port under gauge pressure PD4 and osmotic pressure PO4'<PO4. The pressure PO4' compensates for a fall of the net driving differential $\Delta PN$ due to the fall of osmotic pressure at the feed side as the concentrated saline solution flows from the same-end feed port towards the other-end feed port and sucks in solvent from the permeate side.

Cleaning agent may be added to the dilute saline solution of step (a) and/or to the concentrated saline solution of step (b).

The cleaning method of the present invention is especially advantageous for desalination facilities with energy recovery plant using a plurality of RO modules. In this case, each of the RO modules performs in turn the cleaning process, while the rest of the RO modules perform normal RO separation process. The concentrated saline solution of step (b) is then a portion of the residual brine removed from the rest of RO modules. The rest of the removed residual brine is fed to the energy recovery plant at high pressure PR, and the pressure of the concentrated saline solution withdrawn at step (c) is boosted up to the pressure PR before feeding to the energy recovery plant.

According to another aspect of the present invention, there is provided a cleaning system for performing the above cleaning method in a desalination plant comprising a plurality of modules for RO separation. The RO modules are connected in parallel and are adapted to perform the above-described normal separation process. The desalination plant further comprises a source of raw solution with high-pressure feed pump, a common high-pressure raw solution feed line connecting the front-end feed ports of the modules to the source of raw solution, a common high-pressure brine collection line connecting the rear-end brine ports of the modules to a first brine discharge outlet, and a common permeate collection line connecting the permeate ports of the modules to a product storage tank or a next-stage separator.

The system for cleaning fouled RO membranes according to the above cleaning method comprises:

a) a pressurized source of dilute saline solution providing the pressure PD4;

b) a common high-pressure line connecting the permeate ports of the modules to the source of dilute saline solution;

c) a pressurized source of concentrated saline solution providing the pressure PC5;

d) a first line to connect the source of concentrated saline solution to the feed side of the membrane in each RO module;

e) a second line to withdraw the concentrated saline solution from the feed side of the membrane in each RO module; and f) a plurality of valves adapted to close or open each of the above ports and common lines so as to allow performing of the normal separation process and the cleaning method on each RO module in turn.

In one embodiment, the first line is the common high-pressure brine collection line, the second line is a common line connecting front-end feed ports of the RO modules to a second brine discharge outlet, the system being adapted to use a portion of the collected brine as concentrated saline solution in the step (b) of the method, and to discharge the portion of brine through the second brine discharge outlet in step (c) of the method.

In another embodiment, the first line is the common high-pressure raw solution feed line, the second line is the common high-pressure brine collection line, and the system is adapted to use a portion of the raw solution as concentrated saline solution in the step (b) of the method, and to discharge the portion of raw solution through the first brine discharge outlet in step (c) of the method.

The pressurized source of dilute saline solution may be a permeate storage tank with a high-pressure permeate feed pump. In a preferred embodiment, the permeate storage tank is a pressure-exchange vessel having a permeate chamber and a feed chamber divided by a diaphragm or a piston. The permeate chamber is connected to the common high-pressure cleaning line, while the feed chamber is connected via a first stop valve to a high-pressure fluid source, and via a second stop valve to a discharge line. The vessel can be filled with high-pressure fluid to discharge the permeate under high pressure via the cleaning line, and can be filled with permeate to discharge the fluid through the discharge line. Advantageously, the high-pressure fluid source may be the common high-pressure raw solution feed line or the common high-pressure brine collecting line.

Preferably, in a multi-stage desalination plant where the plurality of RO modules constitute a first stage, the next-stage separators have a booster pump in communication with the next-stage brine outlet and a common brine line connecting the permeate ports of the first-stage modules to the booster pump. Thereby the next-stage brine can be used as dilute saline solution at step (a) of the cleaning method applied in turn to each RO module of the first stage. In particular, the next-stage separator may be connected to the common permeate collection line, and may obtain the next-stage brine from the first-stage permeate.

Advantageously, if each one of the plurality of modules has a front-end permeate port and a rear-end permeate port in communication with the permeate side of the RO membrane, the common permeate collection line is connected to the rear-end permeate port of each module. The system further comprises a second source of second dilute saline solution, a common line connecting the front-end permeate ports of the RO modules to the second source, and a plurality of valves and pumps adapted to close or open each of the ports and common lines and to feed each of the dilute saline solutions with osmotic pressure PO4 or PO4' to the front-end or rear-end permeate port of each of said RO modules under pressure PD4.

The cleaning system preferably comprises a tank with cleaning agent, a line connecting the tank to the source of dilute saline solution, and/or lines adapted to feed the cleaning agent to the feed ports of the modules together with the concentrated saline solution during step (b) of the cleaning method.

If the desalination plant includes an energy recovery plant connected to the first brine discharge outlet, then the cleaning system may further comprise a booster pump with inlet port connected to the second brine discharge outlet and outlet port connected to the common brine collection line.

According to an alternative aspect of the present invention, there is provided a simplified "rinsing" method of cleaning a fouled RO membrane in a module for RO separation as described above. The "rinsing" method comprises a) changing the gauge pressure PF1 to a pulsating gauge pressure PF1' with average value close to the osmotic pressure PO1 so that a net driving differential $\Delta$PN resulting from pressures PO1, PO2, PP2, and PF1' would be directed alternatively to the feed side and the permeate side of the membrane, whereby, when the $\Delta$PN is directed to the feed side, the above-described direct-osmosis cleaning process is performed, while when the $\Delta$PN is directed to the permeate side, the RO membrane performs normal RO separation;

b) withdrawing the raw saline solution together with the separated foulant through said rear-end brine port; and optionally, c) feeding the raw saline solution obtained in step (b) to an energy recovery plant.

The direct-osmosis cleaning method of the present invention provides a number of major advantages:

Cleaning of the RO membranes in a train of RO modules may be performed continuously, in turn with each RO module, without interrupting the operation of any RO module and the desalination process as a whole;

Cleaning of the membranes is so effective that the stage of ultrafiltration pretreatment may be skipped for certain types of raw water, since the inventive cleaning method can remove fouling due to suspended solids present in raw water.

Spirally wound RO membranes may be thoroughly cleaned from accumulated suspended solids, scaling, and bio-fouling;

RO membranes cleaned by this method will have lower pressure drop (hydraulic losses) than membranes cleaned by known methods and will therefore save power required for desalination;

The gauge pressure at the feed side of the RO membrane is never lower than the gauge pressure at the permeate side, thereby preserving the integrity of the membrane;

Operative pressures and workloads in various parts of the desalination plant practically do not change during cleaning, thereby prolonging the operational life of the equipment;

The output of the High-Pressure Pumping group in the desalination plant practically does not change during a cleaning operation which allows to save energy and reduce wear of the pumps and motors.

The utilization of pressure energy is close to ideal. Part of the energy spent for separation of the permeate from the brine is restored in the cleaning process; When permeate or second-stage brine penetrates through the membrane to the feed side with higher osmotic pressure, it acquires the higher gauge pressure of the feed side (at the cost of decreasing the osmotic pressure at the same side). Then this higher pressure of the permeate is utilized in the energy recovery plant.

The method allows brine from intermediate stages of the desalination process to be utilized more effectively.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE INVENTION

Figure 1:
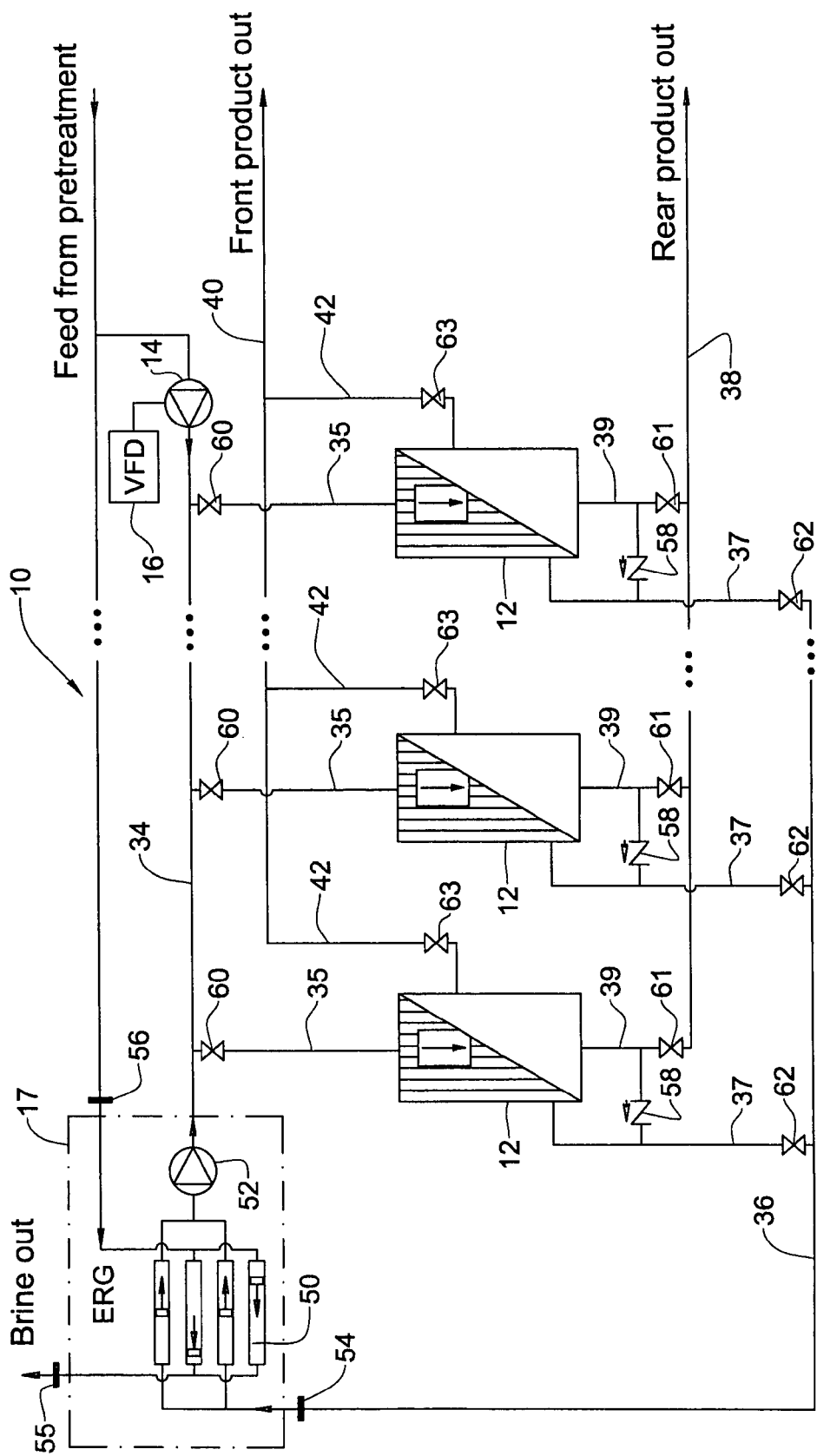
FIG. 1 is a scheme of a prior art desalination plant with a plurality of RO modules.
Figure 2:
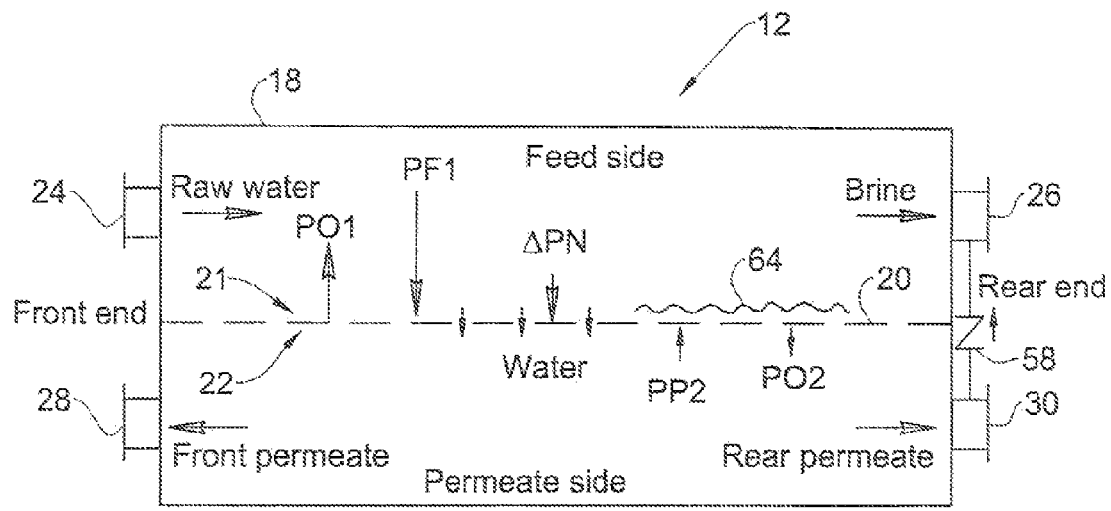
FIG. 2 is a schematic longitudinal section of a RO membrane in a RO module in prior art normal desalination process.
Figure 5:
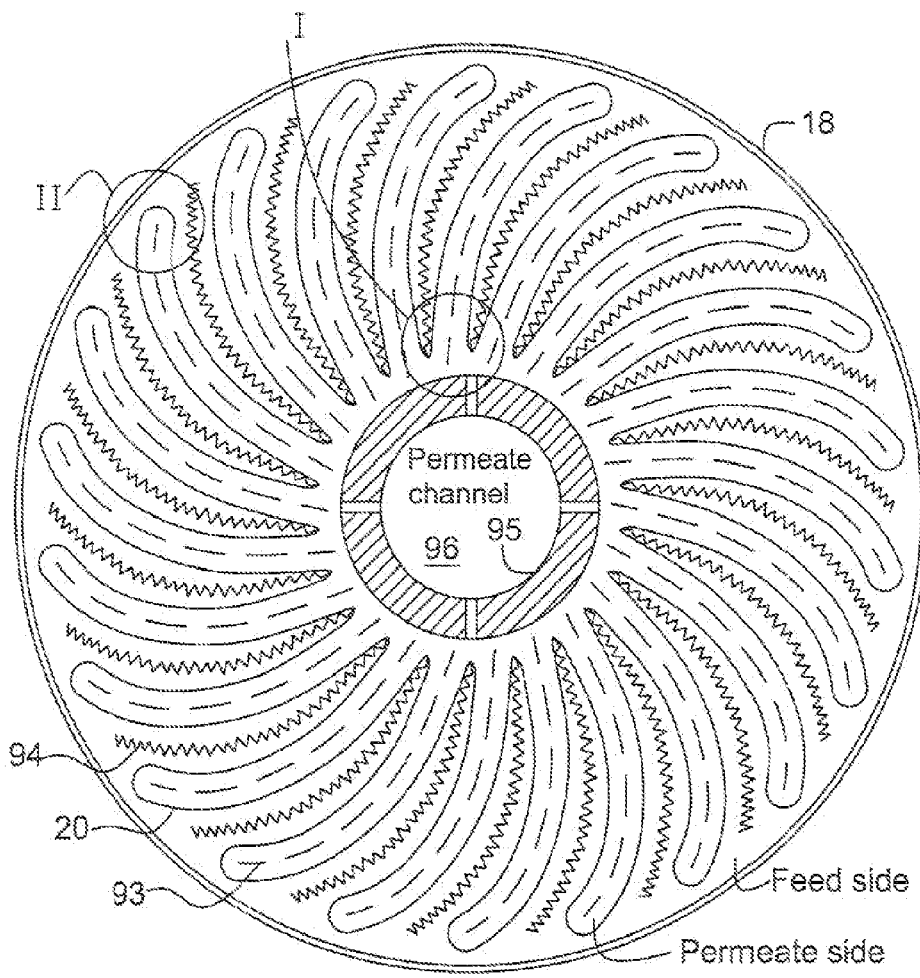
FIG. 5 is a schematic cross-section of a RO membrane in a RO module.

With reference to FIG. 1, there is shown a prior art desalination plant 10 comprising a plurality of modules 12 for RO separation connected in parallel, a high-pressure pumping group (HPP) 14 with variable frequency drive (VFD) 16, energy recovery group (ERG) 17 and interconnecting piping and control means as explained below. With reference also to FIG. 2, each RO module 12 has an elongated housing 18 with front end and rear end. A RO membrane 20 extends between the front end and the rear end dividing the internal volume of the housing into feed side and permeate side (FIG. 2 is simplified, the membrane may be pleated/folded and rolled into a rather complex shape, as shown in FIG. 5). The membrane 20 has, consequently, feed side surface 21 and permeate side surface 22. The housing 18 has front-end feed port 24 and rear-end brine port 26 in communication with the feed side of the membrane 20, and front-end permeate port 28 and rear-end permeate port 30 in communication with the permeate side of the membrane.

The desalination plant 10 further comprises a common high-pressure feed collector 34 connecting HPP 14 to the front-end feed ports 24 of the modules 12 via high pressure feed lines 35; a common high-pressure brine collector 36 connected to the rear-end brine ports 26 of the modules 12 via high-pressure brine lines 37; common rear permeate collector 38 connected to the rear-end permeate ports 30 via rear permeate lines 39; and common front permeate collector 40 connected to the front-end permeate ports 28 via front permeate lines 42.

The ERG 17 comprises a group of work exchangers 50, a circulation pump 52 connected to the feed collector 34, high-pressure brine inlet 54 connected to the brine collector 36, low-pressure brine discharge outlet 55, and low-pressure feed inlet 56.

The desalination plant 10 is connected to a source of raw solution (seawater) such as water pretreatment stage (not shown) at the inlet of the HPP 14 and at the feed inlet 56 of the ERG group 17. Outlets of permeate collectors 38 and 40 are connected to next separation stages or product tanks (not shown). Check valves 58 connect the rear-end brine port 26 to the rear-end permeate port 30 of each RO module 12 so as to prevent increasing of the pressure at the permeate side over the pressure at the feed side. A plurality of valves 60, 61, 62, 63 are adapted to close or open each of the above ports and common lines as will be explained below.

A normal RO separation process in the desalination plant 10 will now be described, with specific pressure values given only as a non-limiting example.

Pretreated seawater with osmotic pressure PO1=33 bar is supplied to the suction side of HPP 14 and the feed inlet 56 of ERG 17. High-pressure feed water supplied from HHP and ERG under gauge pressure PF1=65 bar enters the high-pressure feed collector 34 and, via high-pressure feed lines 35 and front-end feed ports 24 enters the feed side of RO modules 12. The excess pressure $\Delta P = PF1 - PO1 = 32$ bar drives the water to the permeate side of the RO membrane. The obtained permeate product has low TDS content and low osmotic pressure PO2≈0.3 bar. The permeate is withdrawn from the permeate side under gauge pressure PP2≈2 bar. Hence, the net driving differential across the membrane is:

$$\Delta PN = PF1 - PO1 - PP2 + PO2 \approx 30.3 \text{ bar}$$

The feed water salinity and osmotic pressure increase as the feed water flows towards the rear end of the module while the gauge pressure falls due to hydraulic losses. Therefore, the net driving differential falls, and the permeate salinity varies along the membrane. Thus, the obtained permeate can be divided into front permeate (lower TDS) transferred via front permeate collector 40, and rear permeate (higher TDS) transferred via rear permeate collector 38.

The seawater that reaches the rear end of the feed side is high-salinity brine with osmotic pressure PO3=58 bar. It exits the RO module 12 under gauge pressure PB3=64 bar via the rear-end brine port 26, high-pressure brine line 37, enters the high-pressure brine collector 36 and is passed to the ERG 17. In the ERG, the high pressure of the brine is transferred to the feed water while the brine is discharged through the outlet 55.

The seawater usually contains potential foulants such as suspended particles, organic molecules, live microorganisms or dissolved salts which may form scale. During the process of separation, the foulants 64 accumulate at the feed side of the RO membrane contaminating it, reducing its permeability and increasing the hydraulic losses.

Figure 3:
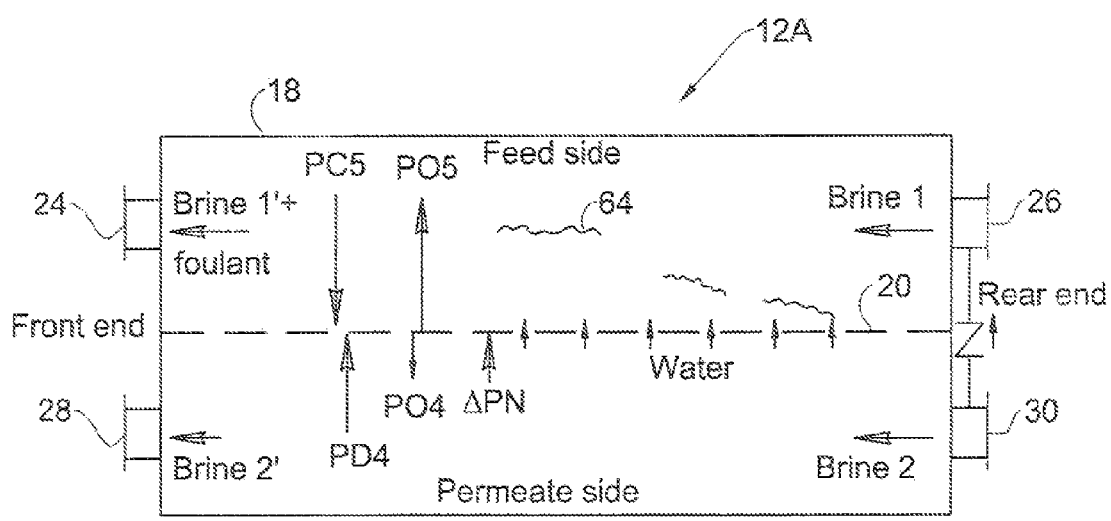
FIG. 3 is a schematic longitudinal section of a RO membrane in a RO module in the direct osmosis cleaning process of the present invention.
Figure 4:
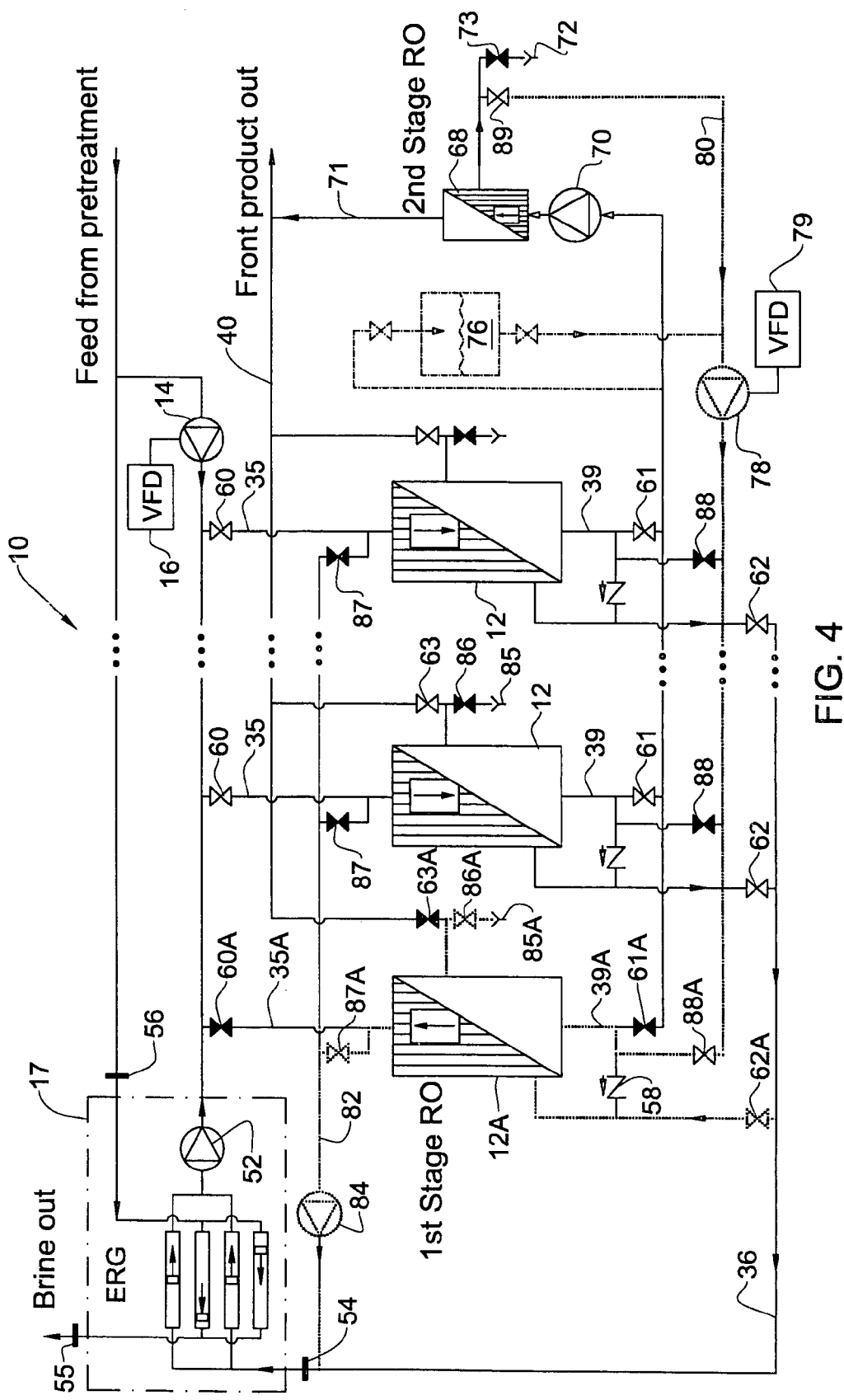
FIG. 4 is a scheme of the desalination plant of FIG. 1 equipped with a cleaning system of the present invention.

With reference to FIGS. 3 and 4, the system and the method of the present invention for cleaning fouled RO membranes by direct osmosis will be described in detail. FIG. 4 shows the inventive cleaning system integrated with the desalination plant 10 of FIG. 1. The latter has additionally a second-state RO module 68 with middle-pressure pump 70. The second-stage module 68 receives rear-end product (permeate) from the permeate collector 38 of the first stage described above, transfers the second-stage permeate 71 to the front permeate collector 40, and discharges residual brine to drain 72 through valve 73.

The system for cleaning fouled RO membranes by direct osmosis comprises:

a) a pressurized source of dilute saline solution such as brine from the second-stage RO module 68 with a cleaning booster pump 78 having a variable frequency drive 79;

b) a high-pressure cleaning collector 80 connecting the rear permeate ports 30 of the RO modules 12 to the source of dilute saline solution;

c) a cleaning brine collector 82 connected to front-end feed ports 24 of the RO modules;

d) a cleaning booster brine pump 84 with inlet connected to the brine collector 82, and outlet connected to the high-pressure brine collector 36;

e) drains 85 at the front-end permeate ports 28 of each module 12; and f) a plurality of valves 86, 87, 88, and 89 adapted to close or open each of the above ports and collectors, so as to allow performing of the normal separation process and the cleaning method on each RO module in turn, as will be explained below.

The inventive cleaning method, applied for example to the RO module 12A, works in the following way:

a) stop-valves 60A, 61A and 63A associated with the module 12A are closed, while the same valves on the other RO modules are opened (closed valves are drawn in solid black in FIG. 4), whereby the module 12A quits the normal RO process;

b) stop-valve 62A remains opened, whereby the rear-end brine port of the module 12A remains connected to the high-pressure brine collector 36;

c) stop-valve 87A is opened and the cleaning booster brine pump 84 is operated, whereby the brine starts to circulate through the feed side of the module 12A in reverse direction;

d) the cleaning booster pump 78 is operated to feed second-stage brine to the permeate side of the RO membrane in the module 12A; and e) the valve 86A is opened to drain the remaining second-stage brine from the permeate side.

FIG. 3 explains in further detail the cleaning process on the RO membrane (the pressure values are only exemplary). The second-stage brine (Brine 2) has osmotic pressure PO4=13 bar and is fed to the permeate side under gauge pressure PD4=33 bar. The first-stage brine (Brine 1) at the feed side has osmotic pressure PO5=PO3=58 bar and gauge pressure PC5=PB3=64 bar, as in the normal RO process described with reference to FIG. 2. The net driving differential $\Delta PN$ is now:

$$\Delta PN = PC5 - PO5 - PD4 + PO4 \approx -14 \text{ bar}$$

$\Delta PN$ is directed to the feed side, whereby the water is sucked from the permeate side of the RO membrane to the feed side. The water penetrates into the interface between the membrane and the accumulated foulants 64, and separates the foulants from the membrane surface. The first-stage brine, together with the foulants and the penetrated water (Brine 1') is withdrawn through the front-end feed port 24 under gauge pressure which is less than PB3 due to hydraulic losses in the flow along the membrane. The booster brine pump 84 restores these losses and feeds the brine to the common high-pressure brine collector 36 for passing to the EGR 17. The net driving differential can be adjusted by regulating the pressure PD4 by means of the VFD 79.

It will be appreciated that in the operation of the desalination plant, the direct-osmosis cleaning method of the present invention can be applied in turn to each RO module 12 by switching of valves, without interrupting the desalination process. Advantageously, the penetrating water acquires higher gauge pressure at the feed side, PC5, and this pressure is later returned to the system in the energy recovery group 17. In this way, part of the energy spent for separation of the permeate from the brine, and preserved in the form of higher osmotic pressure of the latter, is restored in the cleaning process.

The dilute solution which is used as source of water in the cleaning process may be taken also from other stages of the desalination plant, or from other sources. FIG. 4 shows (in phantom line) that rear permeate stored in tank 76 may be used instead of second-stage brine. Raw seawater may be used as concentrated solution at the feed side instead of brine. For example, seawater from the ERG 17 may be taken before the booster pump 52 and used in the cleaning process. Cleaning agent (not shown) can be added to the dilute solution, or to the concentrated solution, or to both.

In the inventive method, the gauge pressure at the feed side PC5 is between the feed water pressure PF1 and the osmotic pressure of the feed water PO1 in the normal RO process. The gauge pressure PD4 at the permeate side is significantly higher than the gauge pressure PP2 in the normal RO process, so as to provide $\Delta PN$ directed to the feed side. The net driving differential $\Delta PN$ is lower than the osmotic pressure of the saline solution at the feed side, thereby avoiding the "catastrophic" filtration described in the Background.

The latter advantage is illustrated in FIG. 5, showing schematically the cross-section of the RO module 12. The RO membrane 20 is pleated, with highly permeable spacer material 93 and 94 inserted between the membrane folds at the feed side and the permeate side, respectively. The membrane is rolled into a very tight spiral around a tube 95 and is inserted in the module housing 18. The tube 95 is perforated and constitutes a permeate channel 96 connecting the front-end permeate port 28 and the rear-end permeate port 30 to the permeate side of the RO membrane 20. It can be seen that the dilute solution (permeate) can easily reach membrane parts adjacent to the permeate channel 96, such as in zone I. However, it will take much time and hydraulic losses for the dilute solution to reach remote membrane parts in the peripheral zone II. The present method allows the net driving differential $\Delta PN$ to be regulated so that the dilute saline solution can reach the remote parts of the membrane before the water is entirely sucked to the feed side of the membrane through the parts adjacent to the permeate channel 96.

The efficiency of the present method may be enhanced in the following ways:
  Alternating from time to time the feeding and the withdrawing of the concentrated saline solution between the front-end feed port 24 and the rear-end brine port 26, for example by reversing the booster pump 84;
  Application of pulsating gauge pressure PD4, for example by means of the VFD 79; and
  Changing from time to time the gauge pressure PD4 and/or PC5 so that the net pressure differential $\Delta PN$ is reversed towards the permeate side, whereby the RO module will perform in alternating manner direct osmosis cleaning and normal RO separation process.

It will be appreciated that, as the concentrated solution flows along the feed side of the membrane, for example from the rear end towards the front end (Brine 1 in FIG. 3), and takes up water, its osmotic pressure PO5 diminishes. Thereby, the net driving differential $\Delta PN$ diminishes also and the membrane cleaning may become non-uniform if not stop at all. In the following embodiment, the cleaning method of the present invention is improved to overcome this disadvantage. For this purpose, a source of second dilute solution is provided, with osmotic pressure PO4' lower than PO4. This may be, for example, the rear-end permeate with PO4'$\approx$0.3 bar from the tank 76 shown in FIG. 4. Another high-pressure pump, a cleaning collector and valves (not shown) are added to connect the front permeate ports 28 of the RO modules 12 to the source of second dilute saline solution.

Figure 6:
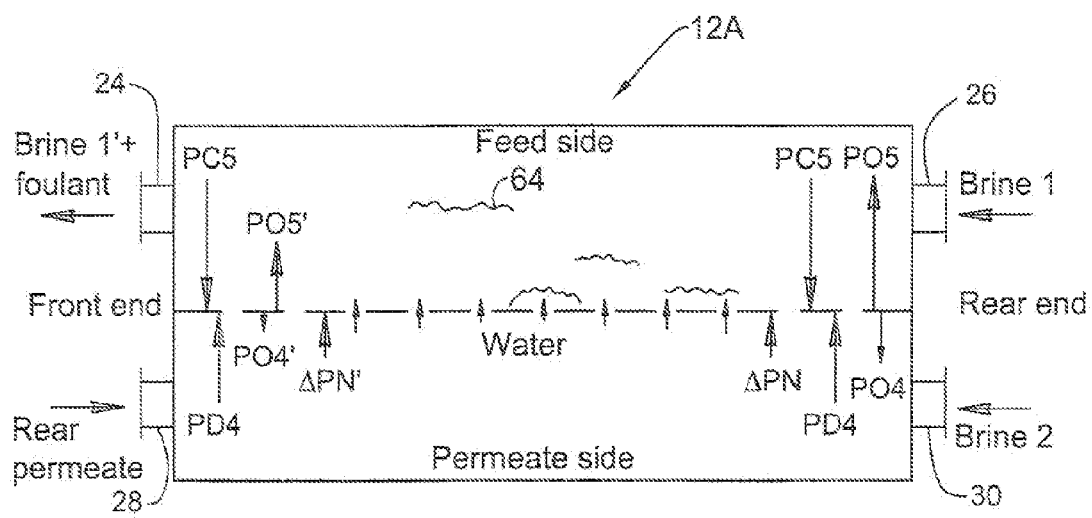
FIG. 6 is a schematic longitudinal section of a RO membrane in a RO module in a variation of the direct osmosis cleaning process.

The operation of the improved method is illustrated in the schematic view of FIG. 6. It differs from the operation shown in FIG. 3 in that the second dilute solution (Rear permeate) is fed to the permeate side via the front-end permeate port 28 under the same gauge pressure PD4. If, for example, the concentrated solution Brine 1' at the front end of the feed side becomes so diluted that its osmotic pressure falls to PO5'=44 bar, then the net driving differential $\Delta PN$ will vanish and the water penetration through the membrane will stop. However, by feeding rear permeate through the front-end permeate port 28, we obtain new net differential:

$\Delta PN'=PC5-PO5'-PD4+PO4'\approx64-44-33+0.3=-12.7$ bar

Thereby, the water penetration and the cleaning process are effectively restored.

Using the principle of alternating RO and direct osmosis, as described above, the method of the present invention may be simplified to "rinsing" of fouled RO membranes without stopping the operation of the RO module. The "rinsing" method comprises:
  a) lowering the average gauge pressure of the feed PF1 to a level about the osmotic pressure PO1 so that the average net driving differential $\Delta PN$ resulting from pressures PO1, PO2, PP2, and PF1 is close to zero;
  b) Varying the instant gauge pressure of the feed PF1' about the average value PF1, so that the instant net driving differential $\Delta PN'$ is directed alternatively to the feed side and to the permeate side of the membrane. Thereby, when the $\Delta PN'$ is directed to the feed side, the direct-osmosis cleaning process is performed, while when the $\Delta PN'$ is directed to the permeate side, the RO membrane performs normal RO separation;
  b) withdrawing the raw saline solution together with the separated foulant through the rear-end brine port; and
  c) feeding the raw saline solution with the foulant to the ERG.

It would be appreciated that the simplified "rinsing" method may be performed on all RO modules simultaneously, by a short time interruption of permeate product production. The "rinsing" method is not so efficient as the basic cleaning method of the present invention but it can be applied to the desalination plant 10 without adding any new equipment.

Figure 7:
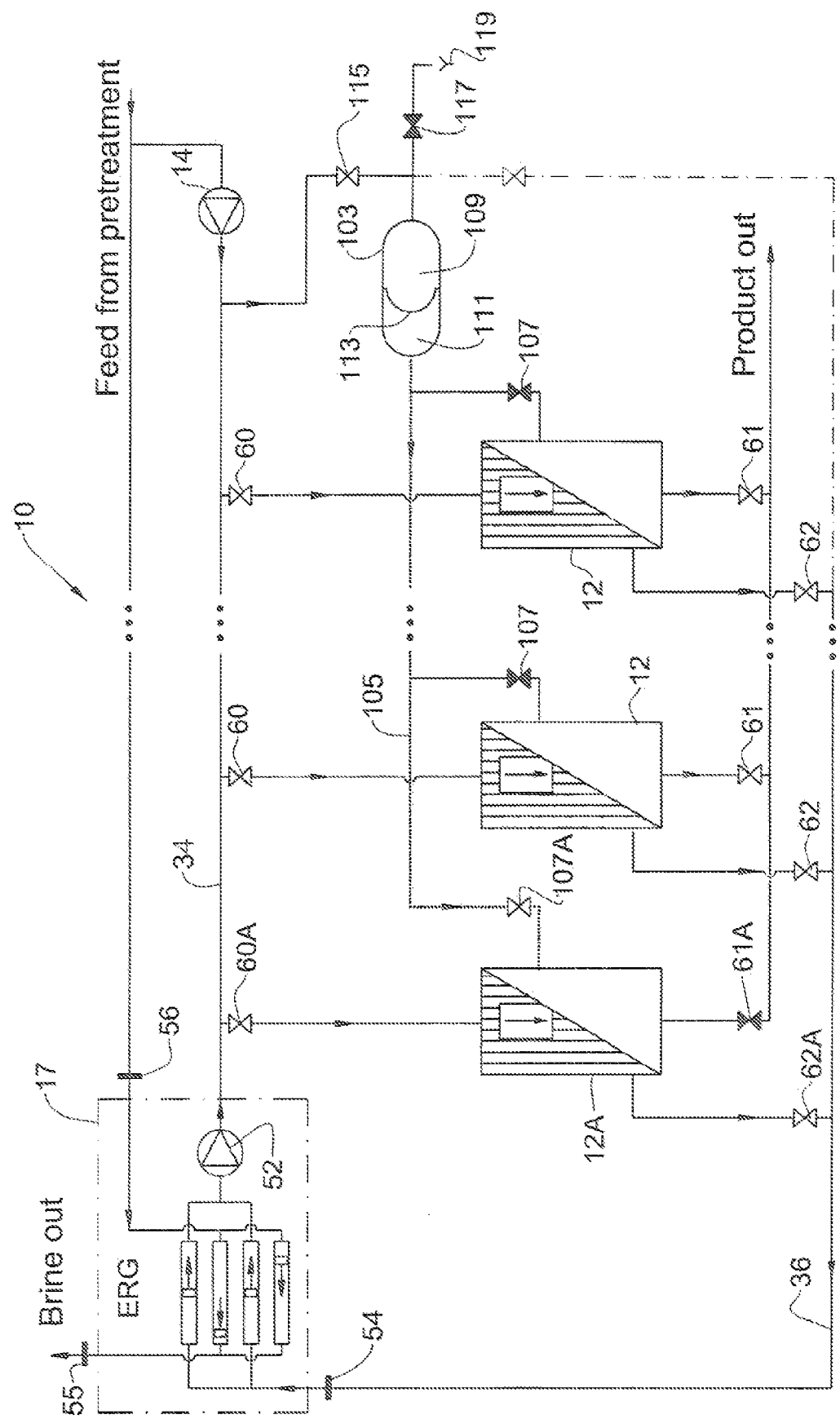
FIG. 7 is a scheme of the desalination plant of FIG. 1 equipped with a "cyclic" cleaning system of the present invention.

Another simplified system performing an effective "cyclic" version of the same direct-osmosis cleaning process is illustrated in FIG. 7. The simplified cyclic cleaning system is integrated, as before, in the desalination plant 10 in FIG. 1, but does not involve connections to next RO stages, and comprises only:
  a) a pressure-exchange vessel 103 storing a limited quantity of permeate from the first-stage RO modules 12;
  b) a high-pressure cleaning collector 105 connecting the permeate ports of the RO modules 12 to the pressure-exchange vessel 103; and
  c) valves 107 adapted to close or open each of the permeate ports to the cleaning collector 105, so as to allow performing of the normal separation process and the simplified cyclic cleaning method on each RO module in turn.

The pressure-exchange vessel 103 has a feed-water chamber 109 and a permeate chamber 111 divided by a flexible diaphragm 113. The permeate chamber 111 is in communication with the cleaning collector 105 while the feed-water chamber 109 is connected to the high-pressure feed collector 34 via a stop-valve 115, and to a drain pipe 119 via a drain valve 117. The permeate collector 38 and the valves 61 connecting it to the RO modules are adapted to work under the high pressure of the feed collector 34.

The cyclic cleaning process, applied for example to the RO module 12A, works in the following cleaning cycle:

a) Stop-valve 61A associated with the module 12A is closed, whereby the module 12A quits the normal RO separation process;

b) Stop-valves 107A and 115 are opened, whereby the feed water under the high feed pressure enters the feed-water chamber 109 and displaces the diaphragm 113 and the permeate from the chamber 111 towards the permeate side of the RO module 12A. The cleaning sequence is finished when the chamber 111 collapses to a minimum volume or the stop-valve 115 is closed;

Then a reverse sequence is performed:

c) The stop-valve 115 is closed while the drain valve 117 and the stop-valve 61A are opened, whereby the RO module resumes the normal RO separation process. A portion of the permeate fills the permeate chamber 111 and displaces the feed water from the chamber 109 through the drain pipe 119; and d) The valve 107A is closed when the pressure-exchange vessel 103 is filled with permeate, whereby the system is ready for a next cleaning cycle.

All the time stop-valves 60A and 62A remain open, so that the high-pressure flow from the feed collector 34 to the brine collector 36 is not interrupted.

At the step (c), the gauge pressures at the feed side and at the permeate side of the membrane are equalized. However, the osmotic pressure in the permeate channel is much lower than in the feed-brine channel, whereby the net driving differential $\Delta PN$ is reversed towards the feed side, and the permeate passes back through the membrane separating the foulant therefrom. The mobilized foulant is carried away with the high-pressure flow through the brine collector 36 and is drained through the ERG 17. Due to the high gauge pressure in the permeate channel, the sucked-back water has sufficient energy to reach the remote areas of the membrane.

It will be appreciated that the diaphragm 113 is needed only to separate the permeate from the feed water in the pressure-exchange vessel 103. Instead, cylinder with a plunger may be used, similar to work exchangers 50. The valve 115 may be complemented with a pressure regulator to control the driving differential $\Delta PN$ if necessary. The drained feed water may be returned back to the suction side of the HPP 14. The pressure-exchange vessel 103 may use, as a source of high-pressure fluid, not only the feed collector 34 but also the brine collector 36. The high-pressure cleaning collector 105 may be connected to either permeate port (front or rear), or to both.

The cyclic process allows cleaning the membranes without depressurization of the RO modules and without stopping the feed-brine flow and the flow towards the energy recovery plant. Advantageously, it does not use another pressure source besides the pressure of the feed flow, and does not require a variable frequency drive or other complicated control of the HPP output. Due to the same reason, the gauge pressure in the permeate channel cannot exceed the gauge pressure in the feed channel, so that the check valves 58 become unnecessary. The available quantity of permeate for one cleaning cycle is limited by the volume of the pressurization cylinder 103 but the cycle may be repeated as necessary.

Although a description of specific embodiments has bee presented, it is contemplated that various changes could be made without deviating from the scope of the present invention. For example, the cleaning method of the present invention may be used for cleaning nanofiltration and ultrafiltration membranes. It can be applied to single RO modules, and can be used with any type of energy recovery device, such as Pelton turbine, Francice turbine, or work exchanger.

The invention claimed is:

1. A method of cleaning a fouled Reverse Osmosis (RO) membrane in a module for RO separation, said membrane having a feed side and an opposite permeate side and extending between a front end and a rear end of said module, said module having a front-end feed port and a rear-end brine port in communication with said feed side of the membrane, and at least one permeate port in communication with said permeate side of the membrane, a normal RO separation process in the same module including feeding raw saline solution, which comprises solvent, dissolved salts and a potential foulant, with osmotic pressure PO1, to said front-end feed port at gauge pressure PF1>PO1, collecting weak saline solution called permeate from said permeate port at gauge pressure PP2, and removing residual brine from said rear-end brine port at gauge pressure PB3>PO1, the foulant accumulating at the feed side of the RO membrane, said cleaning method comprising a) feeding dilute saline solution to the permeate side of the RO membrane under gauge pressure PD4 and osmotic pressure PO4;

b) feeding concentrated saline solution to the feed side of the RO membrane under gauge pressure PC5 and osmotic pressure PO5, a net driving differential $\Delta PN$ resulting from pressures PO4, PD4, PO5, and PC5 being directed to the feed side, whereby the solvent is being sucked from the permeate side of the RO membrane to the feed side of the RO membrane, penetrates into the interface between the membrane and the accumulated foulant, and separates the foulant from the membrane surface; and c) withdrawing the concentrated saline solution together with the separated foulant and the penetrated solvent from the feed side of the RO membrane, wherein said gauge pressure PC5 is between said pressures PF1 and PO1 in the normal RO process, while said $\Delta PN$ directed to the feed side is provided by raising said gauge pressure PD4 with respect to said gauge pressure PP2 in the normal RO process, and wherein PD4$\leq$PC5.

2. The method of claim 1, wherein said concentrated saline solution of step (b) is residual brine supplied from another RO module performing normal RO separation process, or is said raw saline solution.

3. The method of claim 1, wherein said dilute saline solution of step (a) is the permeate obtained in the same RO module during its normal separation process and stored, or is permeate obtained from another RO module performing normal RO separation process.

4. The method of claim 3, wherein said concentrated saline solution of step (b) is said raw saline solution and said gauge pressure PD4 is equal to said gauge pressure PC5.

5. The method of claim 4, wherein said raw saline solution and said permeate are fed to the respective side of the membrane by the same pressure source that provides the gauge pressure PF1 of the normal RO process.

6. The method of claim 1, wherein said RO module is a first-stage module in a multi-stage desalination plant and said dilute saline solution of step (a) is residual brine obtained in a next-stage separator of the same desalination plant.

7. The method of claim 1, wherein said permeate side of the RO membrane communicates with said permeate port through a permeate channel, said RO membrane having parts near said permeate channel and parts remote therefrom, and said net driving differential $\Delta PN$ is such that it allows said dilute saline solution to reach said remote parts of the RO membrane before said solvent is entirely sucked to the feed side of the membrane through said near parts thereof.

8. The method of claim 1, wherein said concentrated saline solution is fed to said rear-end brine port at step (b), and is withdrawn from said front-end feed port at step (c).

9. The method of claim 1, wherein said concentrated saline solution is fed to said front-end feed port at step (b), and is withdrawn from said rear-end brine port at step (c).

10. The method of claim 1, wherein the feeding at step (b) and the withdrawing at step (c) of the concentrated saline solution are from time to time alternated between said front-end feed port and said rear-end brine port.

11. The method of claim 1, wherein said gauge pressure PD4 is pulsating.

12. The method of claim 1, wherein at least one of said gauge pressures PD4 and PC5 is from time to time changed so that said net pressure differential $\Delta PN$ is reversed towards the permeate side, whereby the RO module performs, in said time to time, normal RO separation process.

13. The method of claim 1, wherein said RO module has a front-end permeate port and a rear-end permeate port in communication with said permeate side of the RO membrane, the feeding in said steps (a) and (b) being performed through the same-end port of the respective side, the method further comprising:
a') feeding a second dilute saline solution to the other-end permeate port under gauge pressure PD4 and osmotic pressure PO4'<PO4, said pressure PO4' compensating for a fall of the net driving differential $\Delta PN$ due to a fall of osmotic pressure at the feed side as the concentrated saline solution flows from said same-end feed port towards said other-end feed port.

14. The method of claim 1, including adding a cleaning agent to the dilute saline solution of step (a) and/or to the concentrated saline solution of step (b).

15. The method of claim 1, including
d) feeding the concentrated saline solution obtained in step (c) to an energy recovery plant.

16. The method of claim 15, wherein said RO module is one of a plurality of RO modules, the rest of said plurality of RO modules performing normal RO separation process, said concentrated saline solution of step (b) is a portion of the residual brine removed from said rest of RO modules, and the method is applied in turn to each RO module of said plurality.

17. The method of claim 16, wherein at least a portion of the removed residual brine from said rest of RO modules is fed to said energy recovery plant at pressure PR, and the step (d) includes boosting the pressure of the concentrated saline solution withdrawn at step (c) up to said pressure PR.

18. A method of cleaning a fouled Reverse Osmosis (RO) membrane in a module for RO separation, said membrane having a feed side and an opposite permeate side and extending between a front end and a rear end of said module, said module having a front-end feed port and a rear-end brine port in communication with said feed side of the membrane, and at least one permeate port in communication with said permeate side of the membrane, a normal RO separation process in the same module including feeding raw saline solution, which comprises solvent, dissolved salts and a potential foulant with osmotic pressure PO1, to said front-end feed port at gauge pressure PF1>PO1, collecting weak saline solution called permeate with osmotic pressure PO2 from said permeate port at gauge pressure PP2, and removing residual brine from said rear-end brine port, the foulant accumulating at the feed side of the RO membrane, wherein said cleaning method comprises
a) changing said gauge pressure PF1 to a pulsating gauge pressure PF1' with average value close to said osmotic pressure PO1 so that a net driving differential $\Delta PN$ resulting from pressures PO1, PO2, PP2, and PF1' would be directed alternatively to the feed side and the permeate side of the membrane, whereby, when said $\Delta PN$ is directed to said feed side, the solvent is being sucked from the permeate side of the RO membrane to the feed side of the RO membrane, penetrates into the interface between the membrane and the accumulated foulant, and separates the foulant from the membrane surface, while when said $\Delta PN$ is directed to said permeate side, the RO membrane performs normal RO separation; and
b) withdrawing the raw saline solution together with the separated foulant through said rear-end brine port, wherein the gauge pressure on the permeate side does not exceed the gauge pressure on the feed side.

19. The method of claim 18, including
c) feeding the raw saline solution obtained in step (b) to an energy recovery plant.

* * * * *